United States Patent [19]
Sandstrom et al.

[11] Patent Number: 5,522,447
[45] Date of Patent: Jun. 4, 1996

[54] METHOD AND APPARATUS FOR ON-LINE MONITORING, CLEANING, AND INSPECTION OF CORE BOXES DURING CASTING

[75] Inventors: Donald E. Sandstrom, Sterling Heights; Richard S. Lipka, Farmington Hills, both of Mich.; Thomas A. Grams, Olmsted Township, Ohio

[73] Assignee: Ford Motor Company, Dearborn, Mich.

[21] Appl. No.: 378,297

[22] Filed: Jan. 25, 1995

[51] Int. Cl.[6] ............... B22C 9/10; B22C 7/06; B22C 19/04; B22D 46/00
[52] U.S. Cl. ............ 164/28; 164/4.1; 164/228; 164/155.1; 164/154.2
[58] Field of Search ............ 164/4.1, 457, 150.1, 164/6, 15, 28, 30, 228, 155.1, 155.4, 154.2

[56] References Cited

U.S. PATENT DOCUMENTS

| | | | |
|---|---|---|---|
| 2,601,703 | 7/1952 | Sawyer | 18/47.5 |
| 3,633,010 | 1/1972 | Svetlichny | 235/151.3 |
| 4,048,709 | 9/1977 | Deem | 29/527.6 |
| 4,620,353 | 11/1986 | Pryor | 29/407 |
| 5,174,355 | 12/1992 | Nelson | 164/4.1 |

*Primary Examiner*—Jack W. Lavinder
*Assistant Examiner*—I.-H. Lin
*Attorney, Agent, or Firm*—Joseph W. Malleck; Roger L. May

[57] ABSTRACT

A method and apparatus for fabricating a core within a core box 10 having passages and screens 12 through which an air-sand mixture may flow to occupy cavities within the core box 10 by which the core is shaped. The method comprises providing a plurality of pressure switch sensors 14 disposed upon a core replica 16, each sensor being located in communication with a screen 12 within the core box 10; positioning the replica 16 within the core box 10; monitoring a condition at one or more screens 12 to determine a state of accretion thereat and generating a signal indicative of the condition; sending the signal to a processor which is in operative communication with a means for cleaning; and activating the means for cleaning within the core box 10 in response to the signal so that flow impediments are cleared from the screens 12 and so that constrictions in fluid flow within the core box 10 are detected in their early stages of development and acceptable production rates may be maintained. The apparatus includes a replica 16 of a core to be molded within the core box 10 and a plurality of sensors 14 disposed upon the replica 16. Each sensor is located in communication with a screen 12 within the core box 10.

7 Claims, 3 Drawing Sheets

METHOD AND APPARATUS FOR ON-LINE MONITORING, CLEANING, AND INSPECTION OF CORE BOXES DURING CASTING

TECHNICAL FIELD

This invention relates to a method and apparatus for use in casting metals and is particularly directed to a method and apparatus for on-line monitoring of core box performance, its cleaning, and inspection.

BACKGROUND ART

Conventional precision casting techniques typically begin with the making of a replica, pattern or form of a workpiece to be made, around which molding material is packed to shape the casting cavity of a mold.

Cores are shapes of sand that are placed in the mold to provide castings with contours, cavities and passages. Cores are composed mainly of sand, but also contain one or more binder materials. Sand cores are made in core boxes. A core box, preferably formed from metal, is machined to include portions which define the main body of the core. The shape of the core conforms to the shape of the walls of the workpiece or fixture to be cast. The core is formed by blowing a sand/binder/air mix into the core box under pressure.

After the core is removed from the core box, the core proceeds to subsequent traditional steps of the casting process for producing the desired workpiece. For brevity, those steps will not be described here.

Conventionally, the core is formed from a fine grain sand mixture of approximately two-thirds silica sand and one-third chromite. The sand may be coated with a phenolic resin binder. Core sands are usually silica sands, but zircon, olivine, chromite, carbon and chamotte sands are used also. Coarser sands permit greater permeability and often are preferred for cores. In selecting a core sand, it must be considered that most of the sand from burned-out core centers enters the molding-sand system and may well be a significant portion of the system sand. Under these conditions, a sand must be selected that will be suitable for both molds and cores.

Core blowing is achieved by filling the core box cavity with sand that is suspended in a stream of air and introduced into the cavity at high velocity through blowing holes. The sand is retained by the cavity walls and the air is exhausted through vent holes in the core box. Core blowing is a high-speed operation. A core blowing machine, under proper conditions, will deliver the core sand mixture into a core box within a few seconds, depending on the size of the machine. More time is necessary before the core is removed from the box, depending on whether the binder system being used requires further hardening or curing of the core while it is in the box.

In a known apparatus for core blowing, there is an air inlet, and a chamber which directs air through a sand mixture to form a sand and air mixture which is propelled into the core box cavity. The air is then exhausted from the core box cavity via screened air vents. Conventionally, the location of such screens allows the sand to flow to a dead-end spot, while allowing air to escape. There are other conventional components which are not described here for brevity, including blow valves and exhaust ports.

Following the traditional approaches, the screened air vents often become occluded. This tends to affect the flow of material within the core box and ultimately manifests itself in an impaired product quality and excessive machine downtime during which clogged vents are cleaned. This cleaning is necessitated by the use of sand, resins, and high air pressure in the production of sand cores for cast metal parts. Resin and sand accumulate in the core box passageways and on certain surfaces such as the screens within the core box.

Since the solid core defines voids in the cast product, there is an intimate relationship between the quality of the core and the quality of the resulting product after casting. Accordingly, a need has arisen to engineer core boxes which are used to make the core to increasingly high levels of precision in order to ensure that a solid core is prepared with sufficiently defined and controlled surface characteristics which are ultimately imparted to the cast product.

Conventional foundry practices include the use of abrasive techniques for core box cleaning, wherein the medium is carbon dioxide, glass beads, sand, walnut shells, or sodium bicarbonate. Liquid core box cleaning techniques call for immersion in caustic solution, perhaps enhanced by heat and ultra-sound, or the use of steam under high pressure.

Existing approaches require that the core box be removed from the production machine for cleaning and inspection. Such steps are labor-intensive, time-consuming, and costly. In some cases, where hot caustic solutions are used for cleaning, the steps involved are ergonomically and environmentally hazardous.

In U.S. Pat. No. 4,048,709, a method is disclosed for producing cast metal parts with smooth surfaces. The method includes making a core box and pattern to closer tolerances than the finished part. U.S. Pat. No. 3,633,010 discloses a computer-aided laser-based measurement system in which the surface of a specimen to be evaluated is scanned incrementally by a laser beam in response to program signals generated by a computer. U.S. Pat. No. 4,620,353 discloses a system for electro-optical and robotic casting quality assurance.

SUMMARY OF THE INVENTION

Conventional processes highlight the need for a core box monitoring device which will determine, while the core box tooling is in a production mode (i.e. on-line) the necessity for cleaning, and the particular spot to be cleaned. Ideally, such a device would clean required areas at desired locations and then re-inspect the core box cavity to determine if it is suitable for continued production.

Accordingly, the present invention deals with those steps in the overall casting operation which relate to fabrication of a sand core within a core box. Those steps include:

providing a plurality of pressure switch sensors disposed upon a core replica, each sensor being located in communication with critical screens within the core box the pressure switch sensor installed in line with the core box screen, indicates the condition of the screen, that is, unrestricted, partially restricted, or completely restricted based upon the voltage of the pressure switch;

positioning the replica within the core box;

monitoring a condition at one or more screens to determine a state of accretion thereat and generating a signal indicative of the condition;

sending the signal to a processor which is in operative communication with a means for cleaning; and activating the means for cleaning within the core box in response to the signal so that flow impediments are cleared from the screens and so that constrictions in fluid flow within the core box are detected in their early stages of development and acceptable production rates may be maintained.

The invention recognizes that if the existence of defects in fluid flow within the core box can be detected in their early stages of development by inspection, later quality problems can be avoided.

It is therefore an object of the present invention to avoid the experience of the industry that even photographs or a videotape, though helpful if lighting can be controlled, are generally inadequate when the surface under scrutiny inherently has variations in shadow.

Another object of the invention is to provide an identification and coordinate determination of screens within the core box which are partially or completely clogged by a sand residue. To promote uniform flow of fluid of a fluidized sand mixture within the core box, such screens must be kept free of blockage by fluidized, sticky sand. In such situations, air flow and sand distribution tend to diminish across screens or filters mounted in the core box tooling at strategic locations. Ideally, the screens should be cleaned within the core box—not outside—if acceptable production rates are to be maintained.

To fill such needs, the apparatus of the invention includes a replica of the core being produced is used. The hollow core replica is equipped with sensors which determine the areas which require cleaning. Means are provided for cleaning those areas and for inspecting cleaned areas for acceptability. The disclosed method and apparatus is controlled by a network computer program.

The present invention will become more fully understood from the detailed description given below and the accompanying drawings.

BEST MODE(S) FOR CARRYING OUT THE INVENTION

Figure 1:
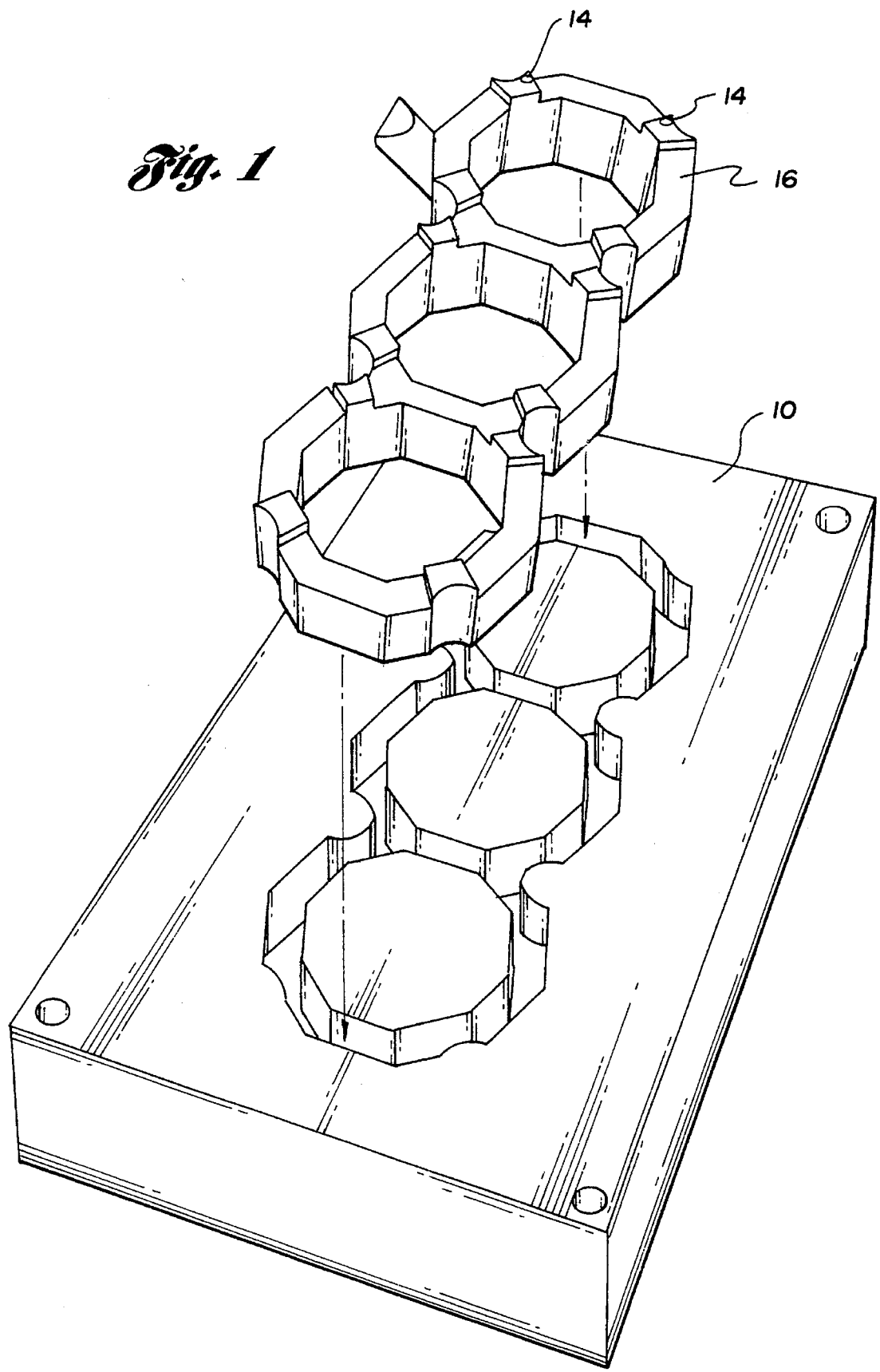
FIG. 1 depicts a replica of a core as positioned in an open core box and illustrates sensors which are positioned around a perimeter of the replica.

The present invention deals with those steps in the overall casting operation which relate to fabrication of a sand core within a core box 10. The invention recognizes that if the existence of defects in fluid flow within the core box can be detected in their early stages of development by inspection, later quality problems can be avoided.

Following are the main method steps:

providing a plurality of pressure switch sensors 14 disposed upon a fixture replica 16, each sensor being located in communication with a screen 12 within the core box;

positioning the replica within the core box;

monitoring a condition at one or more screens to determine a state of accretion thereat and generating a signal indicative of the condition;

sending the signal to a processor 18 which is in operative communication with a means for cleaning 20; and activating the means for cleaning within the core box in response to the signal so that flow impediments are cleared from the screens and so that constrictions in fluid flow within the core box are detected in their early stages of development and acceptable production rates may be maintained.

The invention calls for the use of on-line monitoring, cleaning and inspection of core boxes while they are running in the production mode. A replica of the core being produced is used. The hollow core replica is equipped with sensors which determine the areas which require cleaning. Means are provided for cleaning those areas and for inspecting cleaned areas for acceptability. The disclosed method and apparatus is controlled by a network computer program.

Figure 2:
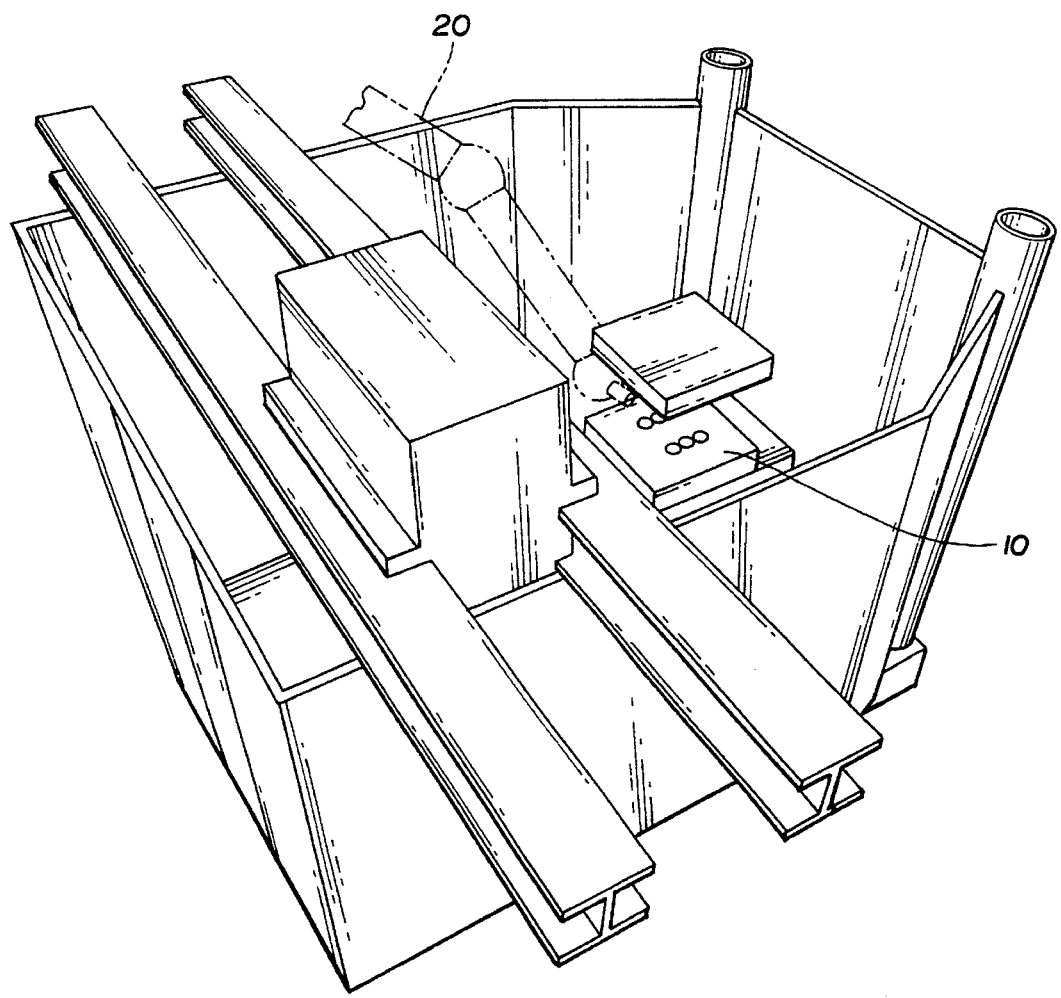
FIG. 2 depicts schematically a robot with an articulating arm for cleaning the core box.
Figure 3A:
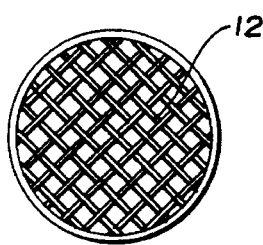
FIGS. 3a, 3b, 3c show progressive clogging of a typical screen.
Figure 3B:
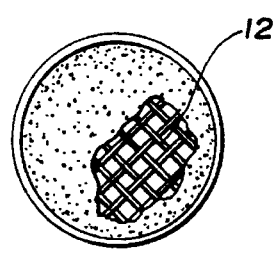
Figure 3C:
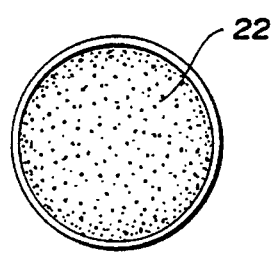
Figure 4:
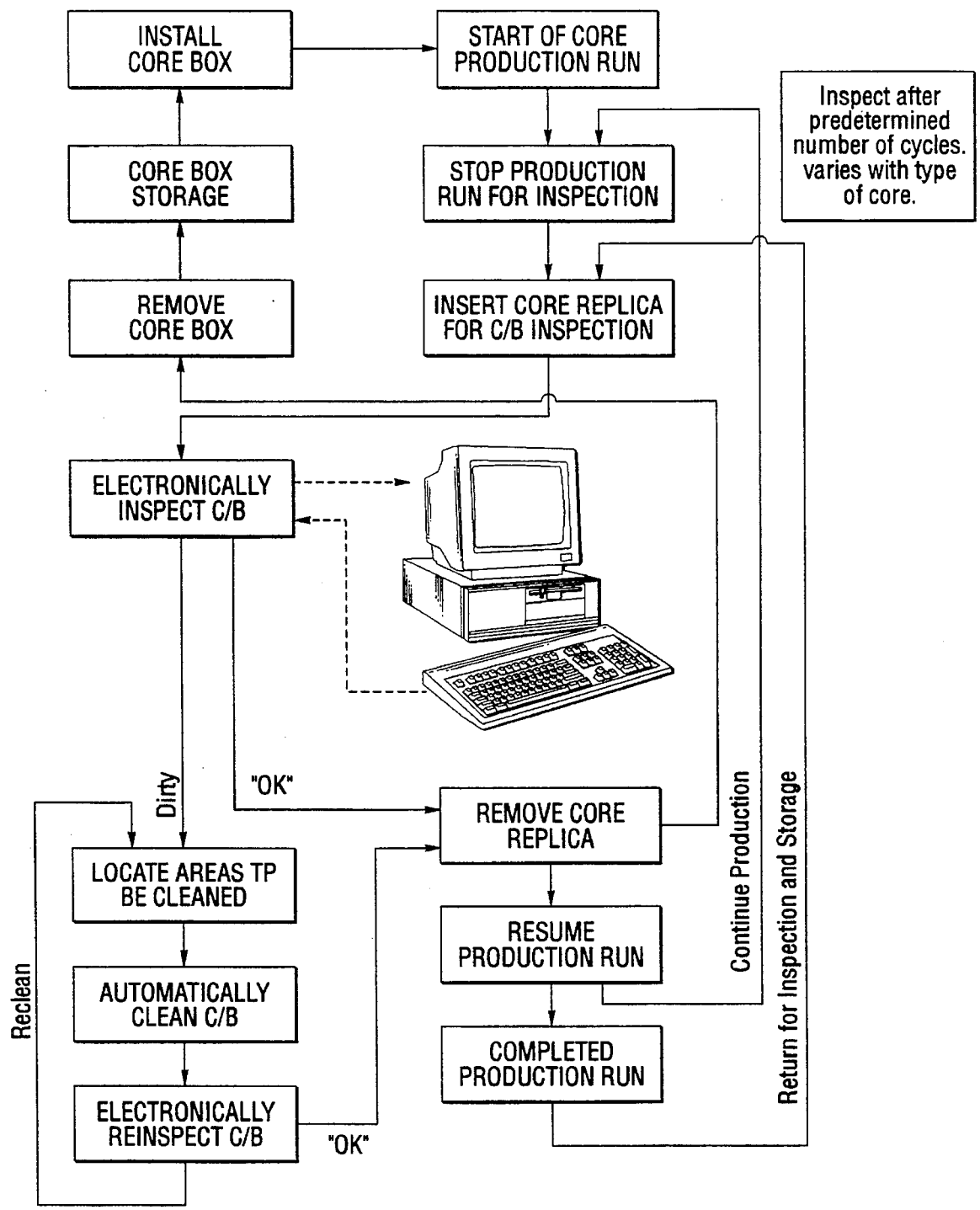
FIG. 4 is a diagram showing the process steps in the inventive method.

FIGS. 1–3 depict the apparatus of the invention, while FIG. 4 illustrates the main process steps involved.

Thus, the invention permits on-line cleaning and inspection of core box tooling during the production run. As a result, productivity is increased and there is an improvement in the quality of parts produced. Other benefits include reduced labor, and reduced scrap. Damage is avoided to tooling and tool wear is minimized since unwanted material is removed from the core box of unwanted accumulation.

To implement such methods, the present invention contemplates a device which incorporates a hollow, duplicate replica 16 (FIG. 1) or model of the sand core being produced. The model may be produced either stereo-lithographically, or by some other rapid prototyping process. The model is fitted internally with electronic sensors 14 in certain critical areas of the core to be blown. The sensors determine if an acceptable core is being blown. If not, the sensors display via a computer monitor 18 (FIG. 4) the location of the problem area(s). Also contained within the model is a means for cleaning 20 (FIG. 2) at desired locations. Once cleaned, the sensors are again used to determine if cleaning is acceptable.

On a predetermined scheduled basis, during a production run, the core replica tool is inserted into the tooling cavity. Sensors are activated, and areas are then cleaned and inspected in response to signals generated by the sensors. The model is then removed and production resumed. A core production line is monitored by a bank of computer monitors for each machine. Each monitor is connected with a central programmed computer. A separate tool and computer program are developed for each core produced and each type of core machine.

It should be noted that the invention is applicable to any type of sand core produced and any core machine. Its application is not limited to automotive casting facilities and can be applied across the metal casting industry.

Examples of cores, the manufacture of which is facilitated by the present invention, include, without limitation, a flywheel end core, head slab cores, water jackets, side cores, a gear end core, a rear chain guard core, a jackshaft core, and crankcase cores.

It will thus be realized that the present invention relates to a dynamic method of core box cleaning which makes better utilization of materials, reduces scrap and tool wear, and avoids problems of waste disposal while enhancing quality and productivity.

The inventors have concluded that the areas within the core box which require cleaning are, in order of importance: vents, parting lines and seals; passageways behind vents; ejector pins; areas under blow tubes; cavity surface areas;

stripper pins; and blow gas plates. Experimentation has shown that if vents are kept clean, the need to clean any of the other areas because an adequate purging irrigation flow is maintained throughout the core box is minimized and production cycles are greatly lengthened before core box removal.

Vent screen build-up occurs as a result of the high pressures and force with which resin-coated sand impacts various surfaces within the core box. Such forces cause resin to be abraded from sand particles. The resin is then atomized by compressed air and recondenses on and behind vent screens. Sand then accumulates on the resin.

During operation of the core box, the sand resin mixture may be injected at various pressures. If those pressures exceed about 60 psi, more screens are required. Cycle times become longer, or resin becomes separated from the sand particles. Screens plug faster. Seals and tool surfaces wear more quickly, and overall core box tool life is shortened. For example, during 80 hours of production, screens, parting lines and cavity surfaces should be cleaned hourly. Additional manpower is required to clean every four hours behind screen surfaces, vent tracks, and ejector pins. Every eight hours, strip pins and actuators should be cleaned. However, there is no practical method to do this without removal from the machine itself. Thus, much time is lost in removing core boxes for major cleaning in today's operating environment.

In the typical production cycle, about five hours is required to clean the core box off-line. Today's practices call for inspection, cleaning, removal, installation, transporting to the cleaning facility, assembly, disassembly, and storage. In one casting plant operation, 28 people are required each day to perform these tasks. However, with the use of on-line cleaning of screens, seals and cavities, delays and inspection times can be minimized while throughput is maximized. Under the methods disclosed by the present invention, minimal blow pressures and impact velocity are needed.

Mobile core box cleaning units can be brought to the core box, which is now designed to be cleaned from the inside outwardly, rather than from the outside inwardly.

Thus, benefits arising from the method and apparatus disclosed herein include elimination of: time-consuming manual processes; hazardous working environments and conditions; caustic processes with fumes and toxic residues; and material handling damage to core boxes due to off-line cleaning.

The robotic core box cleaning process disclosed herein calls for inspection by such means as 3-D laser or equivalent methods. Each core box to be cleaned is bar-coded for identification. Customized end effectors are installed on a robot which incorporates an articulating arm. The end effectors utilize a variety of cleaning tools and are displaced in a manner akin to that exhibited in a CNC machine.

The inventors have considered replacing screen-type vents with ceramic vents including small pore sizes, the average diameter of which is less than that of sand/resin particles. Initial results suggest that high quality cores can be produced for longer periods of operating time with such techniques.

While the best mode for carrying out the invention has been described in detail, those familiar with the art to which this invention relates will recognize various alternative designs and embodiments for practicing the invention as defined by the following claims.

What is claimed is:

1. A method for fabricating a core within a core box having passages and screens through which an air-sand mixture may flow to occupy cavities within the core box by which the core is shaped, the method comprising:

providing a plurality of sensors disposed upon a core replica;

positioning the replica within the core box;

monitoring a condition at one or more screens by the sensors disposed upon the replica to determine a state of accretion thereat and generating a signal indicative of the condition;

sending the signal to a processor which is in operative communication with a means for cleaning; and activating the means for cleaning within the core box in response to the signal so that flow impediments are cleared from the screens and so that constrictions in fluid flow within the core box are detected in their early stages of development and acceptable production rates may be maintained.

2. A method for fabricating a core within a core box having passages and screens through which an air-sand mixture may flow to occupy cavities within the core box by which the core is shaped, the method comprising:

beginning a core production run;

stopping the production run for inspection;

removing an unfinished core from the cavities in the core box;

inserting a core replica into said cavities within the core box for inspecting the core box;

inspecting the core box by electronic sensors disposed upon the core replica;

monitoring a condition at one or more screens within the core box to observe a state of accretion of an air-sand mixture thereat; and determining whether there is an obstruction to flow.

3. The method of claim 2 further comprising:

determining that there is little or no obstruction to flow;

removing the replica from the core box; and resuming and completing the production run.

4. The method of claim 2 comprising:

determining that there is an unacceptable incipient or actual reduction in flow by pressure switch sensors disposed upon the core replica;

locating areas to be cleaned;

deploying a means for cleaning at the areas to be cleaned; and reinspecting the detected areas.

5. The method of claim 4 further comprising:

determining that the result of electronic reinspection is satisfactory; and removing the core replica before resuming the production run.

6. The method of claim 4 further comprising:

determining that results of the electronic reinspection are unacceptable; and locating the areas to be re-cleaned before automatically re-cleaning and re-inspecting them.

7. An apparatus for fabricating a core within a core box having passages and screens through which an air-sand mixture may flow to occupy cavities within the core box by which the core is shaped, comprising:

a replica of a core to be molded within the core box;

a plurality of sensors disposed upon the replica;

means for cleaning located around the core box, the means for cleaning being activated in response to a signal indicative of a state of accretion at one or more screens so that flow impediments are cleared therefrom and so that constrictions in fluid flow within the core box are detected in their early stages of development and acceptable production rates may be maintained.

* * * * *